United States Patent [19]

Kizler et al.

[11] Patent Number: 4,523,916

[45] Date of Patent: Jun. 18, 1985

[54] AXIALLY FLEXIBLE DRIVE DISC

[75] Inventors: Wolfgang Kizler, Fellbach; Wolfgang Sieder, Waiblingen; Hans-Joachim Schöpf, Stuttgart; Helmut Dobler, Esslingen; Roland Glück, Ludwigsburg, all of Fed. Rep. of Germany

[73] Assignee: Daimler-Benz Aktiengesellschaft, Fed. Rep. of Germany

[21] Appl. No.: 503,026

[22] Filed: Jun. 10, 1983

[30] Foreign Application Priority Data

Jun. 11, 1982 [DE] Fed. Rep. of Germany ....... 3222119

[51] Int. Cl.$^3$ .................................................. F16D 3/06
[52] U.S. Cl. .......................................... 464/98; 60/338
[58] Field of Search ............... 74/688, 730; 60/330, 60/338; 464/89, 92, 93, 98, 99

[56] References Cited

U.S. PATENT DOCUMENTS

| | | | |
|---|---|---|---|
| 2,386,017 | 10/1945 | Venditty | 464/98 X |
| 2,588,668 | 3/1952 | Syrovy | 60/338 |
| 2,855,767 | 10/1958 | Ahlen | 464/98 |

FOREIGN PATENT DOCUMENTS

| | | | |
|---|---|---|---|
| 1971310 | 10/1967 | Fed. Rep. of Germany . | |
| 1272666 | 7/1968 | Fed. Rep. of Germany . | |
| 2060792 | 6/1972 | Fed. Rep. of Germany | 464/99 |
| 2224636 | 1/1976 | Fed. Rep. of Germany . | |
| 2620937 | 11/1976 | Fed. Rep. of Germany . | |
| 1021778 | 2/1953 | France | 464/99 |
| 845221 | 8/1960 | United Kingdom . | |
| 838152 | 6/1981 | U.S.S.R. | 464/98 |

OTHER PUBLICATIONS

Daimler-Benz Visual Aide, "Mercedes-Benz Automatic", Aug. 1980.
"Automobiltechnische Zeitschrift", Feb. 1965, pp. 31-40.

Primary Examiner—Stuart S. Levy
Assistant Examiner—Daniel P. Stodola
Attorney, Agent, or Firm—Craig and Burns

[57] ABSTRACT

An axially flexible drive disc of sheet-metal for vehicle propulsion includes a centrally disposed flange for attachment to the end of the drive shaft of the vehicle propulsion engine and is connected at its external circumference at a few, preferably three, fastening points, located evenly distributed around the periphery, to the input element of the adjacent gearbox. The gear box includes a hydrodynamic torque converter as the input element with the converter housing simultaneously assuming the flywheel function for the vehicle propulsion engine. In order to increase the strength of the drive disc with respect to axial fatigue loads, to smooth offset and swash and to reduce frettage corrosion at the fastening elements, the force path from the central flange connection to the radially outwardly located fastening points is given a spiral shape to assure greater bending lengths, by kidney-shaped cutouts disposed between the fastening points and the flange connection so that, as a rough approximation, T-shaped spring elements are left between neighboring cutouts.

22 Claims, 6 Drawing Figures

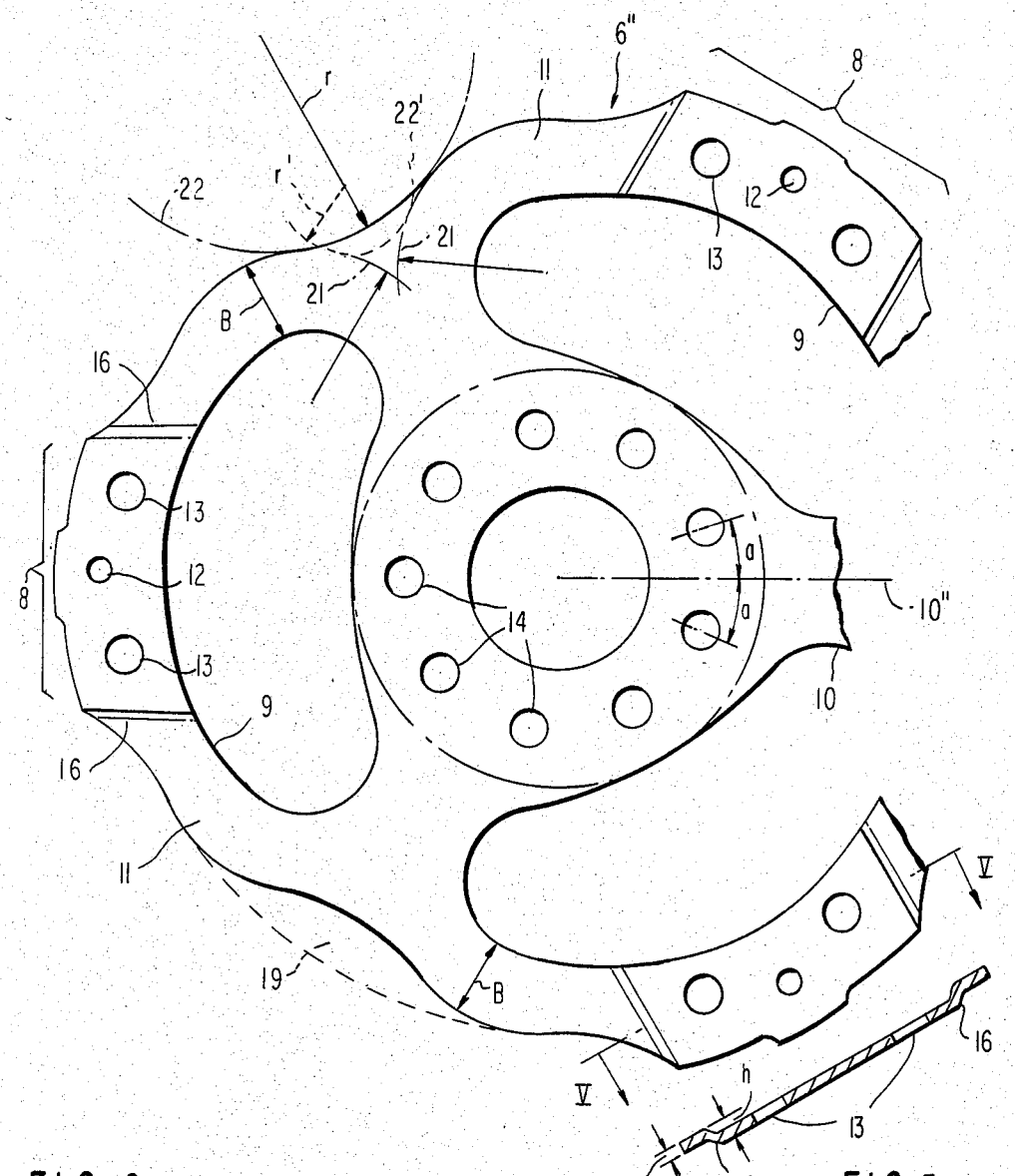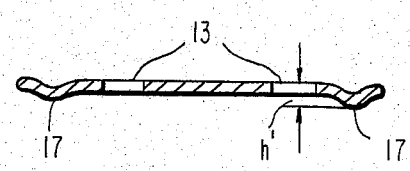

AXIALLY FLEXIBLE DRIVE DISC

The present invention relates to an axially flexible drive disc for vehicle propulsion generally of the type as disclosed, for example, in DE-Z ATZ 1965, 31 ff.

Drive discs of this type are, in particular, installed in automatic gearboxes for motor vehicles. A hydrodynamic operating circuit, usually a Föttinger converter, is provided at the input of the automatic gearbox; the torus-shaped housing of this converter represents the gearbox input element and because of the correspondingly relatively thick dimension of its wall thickness also assumes the function of the flywheel for the internal combustion engine to which it is connected. The drive disc is located between the end of the crankshaft and the housing of the Föttinger converter and couples the converter housing to the end of the crankshaft for rotation in unison therewith in a manner providing for limited movement in the axial direction of the converter relative to the end of the crankshaft. Axial flexibility is necessary not only because of the thermal expansions of the associated machine parts but in fact the flexibility serves mainly to deal with the so-called axial breathing of the converter in its different operating conditions.

Depending on the rotational speed condition, static pressures of different levels build up in the converter which lead to an axial extension and/or to an axial displacement of the converter housing. In the direction of rotation, the drive disc is subjected not only to the driving torque of the engine but, more particularly, to the alternating torsional vibrations, whose peak values can substantially exceed the maximum basic torque. In addition, the drive disc also serves to accept offset and swash between the crankshaft and the converter, which can alter under load.

Known drive discs are essentially triangular or quadrilateral in shape, the drive disc being fastened at its corners to the converter housing. This drive disc can, in fact, transmit the occurring torques and the torque shocks without difficulty but fatique failures in such drive discs do occur occasionally due to the axial load.

The object of the present invention is to improve the basic drive disc in such a way that, with respect to the occurring axial fatique loads, it can withstand without damage the load also over unlimited time periods, i.e. be fatique-resistant.

The underlying problems are solved in accordance with the present invention in that kidney-shaped cutouts are provided in the drive disc which is of at least approximately circular shape, radially between the fastening places and the center flange connection approximately coincidental with the fastening places in the circumferential direction. The cutouts extend in the circumferential direction toward one another to such an extent that spoke-like webs remaining between adjacent kidney-shaped cutouts are at least approximately twice and at most three times as wide as the circumferential rim of the drive disc, which is required as a minimum for rigidity reasons, which extends to the fastening places. Because of the kidney-shaped or reniform cutouts, which are provided radially between the fastening points and the flange bolting to the crankshaft, force paths are created projecting arc-shaped in the peripheral direction, which can be deformed axially with small material stress, i.e., a force path from the central flange connection to the radially outwardly located fastening points has a spiral shape which assures greater bending lengths. Nevertheless, the drive disc is sufficiently rotationally stiff in the circumferential direction.

These and other objects, features and advantages of the present invention will become more apparent from the following description when taken in connection with the accompanying drawing which shows, for purposes of illustration only, several embodiments in accordance with the present invention and wherein:

FIGS. 3 and 4 are axial views of further embodiments of drive discs in accordance with the present invention;

FIG. 5 is a cross sectional view taken in the circumferential direction through a fastening point of the drive disc according to FIG. 4, taken along line V—V; and FIG. 6 is a cross sectional view similar to that of FIG. 5 of a modified embodiment in accordance with the present invention.

Figure 1:
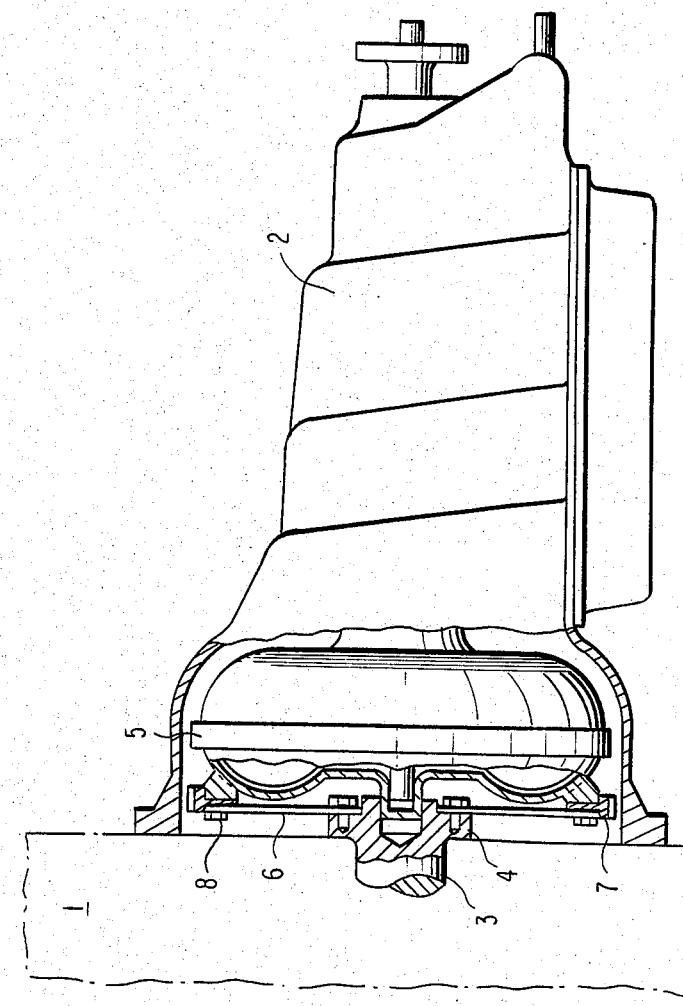
FIG. 1 is a side view, partly in cross section, of a vehicle transmission with a drive disc in accordance with the present invention.

Referring now to the drawing wherein like reference numerals are used throughout the various views to designate like parts, the vehicle propulsion shown in FIG. 1 includes a vehicle propulsion engine 1, shown in dash and dotted lines, and a gearbox 2, rigidly connected to it, which is constructed as a gearbox for an automatic change-speed transmission. The drive shaft 3 of the engine is provided with a shaft flange 4, which is coupled to the input element 5 of the gearbox 2 by way of the rotationally stiff but axially flexible drive disc 6. The input element 5 represents the converter housing of the hydrodynamic operating circuit located in first place within the gearbox; on the basis of its corresponding mass, it simultaneously forms the flywheel for the vehicle propulsion engine. In the illustrated embodiment a toothed starter ring 7 is also attached at the outer periphery to the fastening points 8 of the drive disc. The drive disc 6 is centrally bolted to the drive shaft 3 for rotation in unison therewith by means of a flange connection, for which purpose a number of bolt bores 14 (FIG. 2) located on a circle is located in the center of the drive disc. By means of a centering bore, the drive disc 6 can be centered on a corresponding shoulder of the drive shaft. The illustrated embodiments of drive discs have three fastening points 8 or 8′ located evenly distributed along the periphery.

In order to arrange the drive disc to have a defined flexibility in the axial direction but to be resistant to fatigue loading, the drive disc is at least of approximately round or circular shape, several kidney-shaped or reniform cutouts 9, 9′ i.e., few in number and in the illustrated embodiment three are shown, being located between each of the fastening points 8, 8′ and the peripheral circle 4′ of the drive shaft flange 4. The kidney-shaped cutouts 9, 9′ extend in the peripheral direction equally in the one and in the other direction in such a way that there remains between adjacent cutouts only spoke-type webs 10, 10′, whose width b corresponds to at least approximately twice and at most to approximately three times the radial width B of the peripheral rim 11 of the drive disc. For this purpose, the minimum necessary width for strength reasons should be used as the basis for the comparative dimension. In fact, it is less the rotational loading of the drive disc than the axial loading which determines the width dimension. If the web width is made less than the minimum dimension quoted above, a non-permissively high stress would occur at this point; on the other hand, exceeding the maximum dimension quoted above would not provide, or would provide an unnecessary, reduction of the loading and thus an unnecessary increase in the weight of the drive disc.

Figure 2:
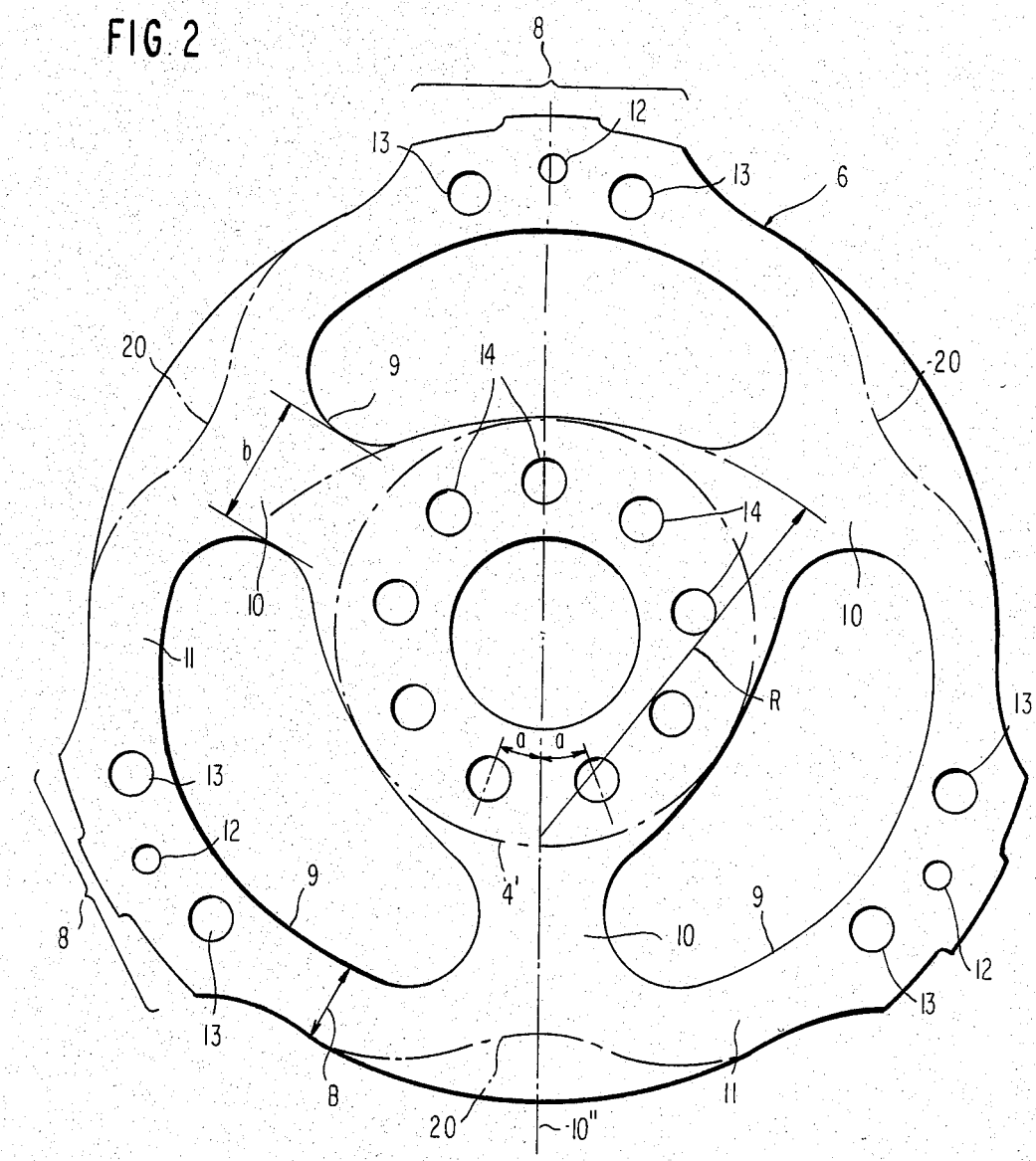
FIG. 2 is an axial view of a first embodiment of a drive disc in accordance with the present invention.
Figure 3:
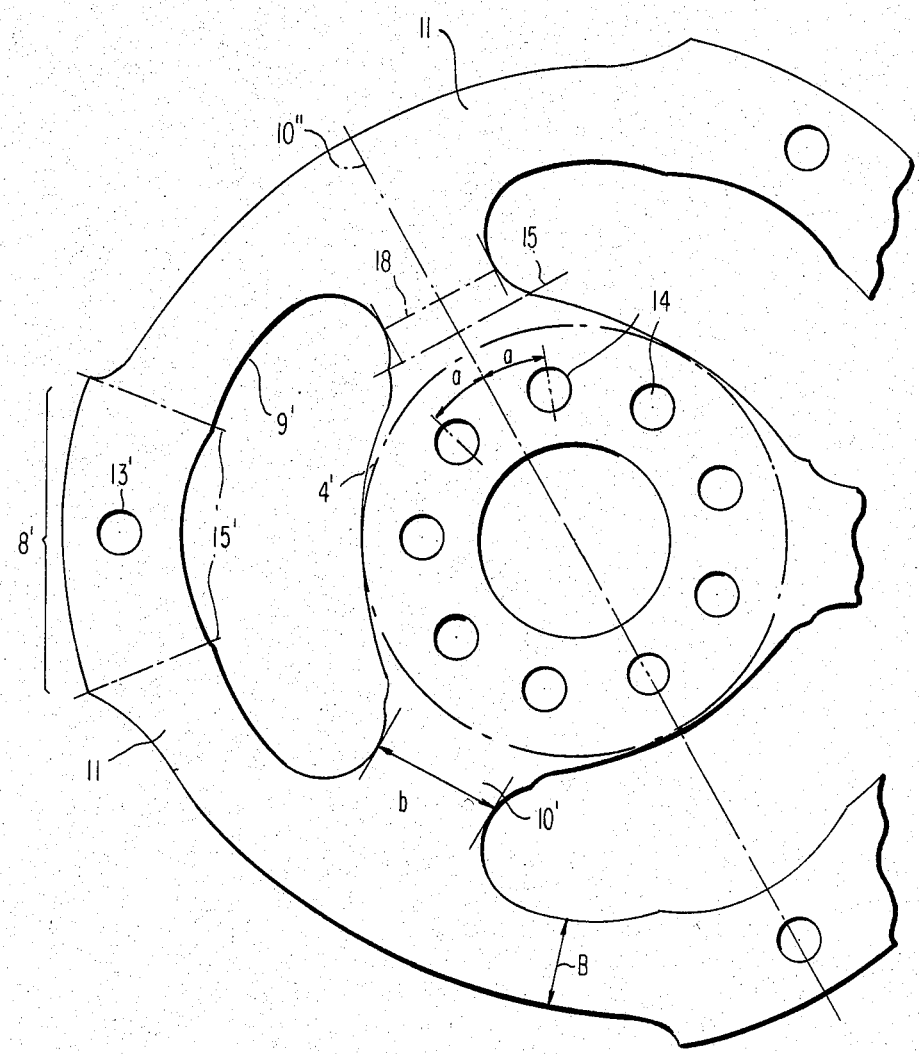

In both of the illustrative examples shown in FIGS. 2 and 4, the fastening points 8, in addition to being provided with a dowel or fixing bore 12 for receiving a dowel or fixing pin, a rivet or the like are also provided with two bolt bores 13 lying on the two sides of it. As a result, the spring paths of the circumferential rim 11 between the spoke-type webs 10, 10' and the fastening points are somewhat shorter than in the case of the fastening points 8' in the embodiment of FIG. 3 with only one single fastening bolt and, correspondingly, with only a single bolt bore 13'.

In order to create a gradual transition from the spoke-type web 10 into the flange connection between the drive disc and the drive shaft and to thereby reduce the stressing of the drive disc by axial loading in the region of the web root, provision is made for each of the kidney-shaped cutouts 9, 9' to be in the shape of an approximately circular arc along their radially inner contour with a relatively large radius of curvature, whereby the inner contours of each of the cutouts touch the circumferential circle 4' of the drive shaft flange at a peripheral position located approximately equally peripherally to the corresponding fastening point 8, 8'. In fact, the radius of curvature R of this inner contour of the cutouts is approximately 1.5 to 4 times as great, preferably approximately twice as great as the radius of curvature of the circle 4'. The line limiting the kidney-shaped cutouts radially outwardly thereof corresponds, at least in the area of the external rim 11, approximately to an equidistant line at a distance of the minimum width B, already mentioned above, of this external rim and runs in the area of the fastening points with the greatest possible transition curve between these two equidistant lines. In the area of the webs, the kidney-shaped cutout 9, 9' is delimited by the greatest possible circular arc between the two boundary lines already mentioned.

Apart from the flange connection located in the center and the fastening points 8, 8' located at the outer periphery, the drive disc substantially represents a multiple star-shaped arrangement of substantially T-shaped axial springs with the spoke-type web 10, 10' as the vertical line and the peripheral ring or rim 11 as the transverse line. A transition into a retaining point is located in the area of each end of these T-shaped springs. In order to further unload these transition areas to the retaining points, which are critical with respect to fatigue load, elastic discontinuity points can be provided thereat. In the embodiment according to FIG. 3, discontinuity points of this type are located along the peripheral rim and in the root region of the spoke-type webs. In particular, the elastic discontinuity points are in the form of a step-type increase 15 or 15' of the area moment of inertia of the above-mentioned T-shaped springs against axial bending. The drive disc having been formed from a constant thickness metal sheet with a sheet thickness d, such a discontinuity point can only occur in an increase of the load-supporting cross section in the direction towards the retaining point. The discontinuity point 15 located in the root region of the spoke-type web 10' is located approximately radially in the center between the narrowest point 18 of the web 10' and the peripheral circle 4' or radially somewhat within this central position.

In the illustrated embodiment according to FIG. 4, the discontinuity points are only provided in the transition region from the peripheral rim 11 to the fastening points 8. They are in the form of a Z-shaped corrugation 16 of the sheet metal material, the step height h of the corrugation corresponding approximately to between half of the sheet metal thickness and the full sheet metal thickness d (FIG. 5). Instead of a Z-shaped or step-shaped corrugation, a U-shaped corrugation or a bead can also be provided in accordance with FIG. 6, where the height h' of this corrugation is again between half the sheet metal thickness and the full sheet metal thickness.

The root area of the spoke-type webs 10, 10' is particularly critical with respect to fatigue loading and more particularly also within the area located in the area of fastening or retention. The bolt bores 14 for the flange connection, however, represent notches in this root region and they should be located as far as possible away from the center line 10" of the spoke-type webs. This is ensured by the fact that the number of the flange bolts for the flange connection to the drive shaft is an even multiple of the number of fastening points 8, 8' and that the bolt bores 14 are so positioned in the peripheral direction that the bolt bores located nearest to the center line 10" in the peripheral direction have the same distance a from this center line.

The radially outer area of the drive disc at the peripheral places where the peripheral rim 11 and the spoke-type webs 10, 10' meet, is only relatively lightly loaded by the axial forces. This region can, therefore, be used either for balancing purposes or it can be completely machined away for stiffness and/or weight reasons. A corresponding recess 19 in this area is illustrated by the drive disc 6" according to FIG. 4, whereas in the embodiment of the drive disc 6 according to FIG. 2, a corresponding boundary line 20 is shown in dash and dotted line which limits the balancing region radially inwards. Within this balancing region, balancing bores, milled grooves or the like can be located without adversely affecting the fatigue strength. This boundary line 20 is formed by a pair of mutually mirror-image, and preferably circular, lines 21 merging tangentially into the external contour of the drive disc, which are equidistant to the two adjacent kidney-shaped cutouts and by a tangential circle 22, 22', common to both equidistant lines. In the embodiment shown in full lines in FIG. 4, a relatively large radius r has been chosen for this tangential circle 22. In the extreme case, a relatively small radius r' can be chosen for this tangential circle 22', as is shown in dotted lines in FIG. 4. This minimum radius corresponds approximately to the minimum width B required for the peripheral rim 11. A relatively large amount of material is therefore available for removal for weight reduction and/or for balancing reasons.

The axial fatigue strength of the elastic drive disc can be substantially increased by the measures of the present invention so that in the area of the fastening or retaining points, no special intermediate layers are required between the bolt head and the drive disc, as was previously necessary. Quite complicated and time-consuming optimizing tests for shaping such intermediate layers had to be undertaken previously. This is no longer necessary; in particular, due to the obviation of these intermediate layers, cost and weight can be saved in each individual case of application. Thanks to the substantial increase in the axial fatigue loading capability, a less strong material can also be chosen for the drive disc than was necessary with the prior art arrangements. This is also leads to a reduction in price. In addition, previously necessary expensive subsequent treatments of the surfaces, such as, for example nitriding or shot-blasting in order to increase the fatigue strength are now also avoidable. Because of the large-area kidney-shaped cutouts in the drive disc of this invention, the latter is also lighter than a conventional triangular or quadrilateral plate so that despite the increased fatigue strength and despite the retention of the same sheet metal thickness, weight can be saved.

While we have shown and described several embodiments in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. An axially flexible drive disc made of sheet metal, which is flangedly connected centrally thereof to an end of a drive shaft of a vehicle engine and which is connected radially outwardly at a plurality of fastening points spaced circumferentially substantially evenly to an input element of an adjacent transmission, said drive disc including a plurality of kidney-shaped cutouts corresponding in number to the number of the plurality of fastening points, each of said plurality of kidney-shaped cutouts being associated with a respective fastening point of the plurality of fastening points and disposed in the same area as the respective fastening point radially between the respective fastening point and the central flange connection, each of said kidney-shaped cutouts extending in both circumferential directions with spoke-type webs remaining between adjacent kidney-shaped cutouts, each of said webs extending from said flange connection to a circumferential rim and being at least approximately twice and at most approximately three times as wide as the minimum width of the circumferential rim of the drive disc which extends toward the fastening points, each of said kidney-shaped cutouts being contoured along a radially inner contour generally in the shape of an arc having a radius of curvature from 1.5 to 4 times that of a circumferential circle of the central flange, the inner contour of each of the plurality of kidney shaped cutouts touching the circumferential circle of the central flange at a peripheral position generally coinciding with the intersection of a line passing through the corresponding fastening point and the central axis of the drive disc.

2. A drive disc according to claim 1 wherein said radius of curvature is approximately twice that of said circumferential circle.

3. A drive disc according to claim 1, wherein at least one of the circumferential rim and the spoke-type webs is provided at a transition from the fastening points respectively to the central flange connection with a discontinuity point in the form of one of a step-type increase of the surface moment of inertia against axial bending and a corrugation means of the sheet metal part extending transversely to the circumferential rim respectively to the spoke-type webs.

4. A drive disc according to claim 3, wherein the discontinuity point is on each of the respective spoke-type webs and is located within an area at least approximately radially midway between the narrowest place of the webs and the circumferential circle of the central flange.

5. A drive disc according to claim 4, wherein the discontinuity point is a corrugation means formed in the shape of a U-shaped groove with a clearance depth between about half the sheet metal thickness and about the full sheet meatal thickness.

6. A drive disc according to claim 4, wherein the discontinuity point is a corrugation means is formed in the shape of a Z-shaped step with a step height between about half the sheet metal thickness and about the full sheet metal thickness.

7. A drive disc according to claim 4, wherein a number of flange bolts is provided in the flange connection to the drive shaft, said number being a multiple of the number of fastening points, bolt bores in the flange connection in the drive disc positioned in the circumferential direction relative to the spoke-type webs so that the bolt bores located nearest to the center line of the spoke-type webs have substantially the same distance from said center line in the circumferential direction.

8. A drive disc according to claim 7, wherein the radially outer areas of the drive disc, where the peripheral rim and the spoke-type webs meet, form balancing areas, and are removed at least partially.

9. A drive disc according to claim 8, wherein the balancing areas are limited in the radially inward direction by a pair of mutually mirror-image lines merging tangentially into the external contour of the drive disc and equidistant to the radially outer boundary lines of two adjacent kidney-shaped cutouts and by a tangential circle common to both equidistant lines.

10. A drive disc according to claim 9, wherein the discontinuity point is a corrugation means formed in the shape of a U-shaped groove with a clearance depth between about half the sheet metal thickness and about the full sheet metal thickness.

11. A drive disc according to claim 9, wherein the discontinuity point is a corrugation means formed in the shape of a Z-shaped step with a step height between about half the sheet metal thickness and about the full sheet metal thickness.

12. A drive disc according to claim 1, wherein the drive disc is generally circularly shaped.

13. A drive disc according to claim 1, wherein only three fastening points are provided.

14. A drive disc according to claim 1, wherein a number of flange bolts is provided in the flange connection to the drive shaft, said number being a multiple of the number of fastening points, bolt bores in the flange connection in the drive disc positioned in the circumferential direction relative to the spoke-type webs so that the bolt bores located nearest to the center line of the spoke-type webs have substantially the same distance from said center line in the circumferential direction.

15. A drive disc according to claim 1, wherein the radially outer areas of the drive disc, where the peripheral rim and the spoke-type webs meet, form balancing areas and are removed at least partially.

16. A drive disc according to claim 15, wherein the balancing areas are limited in the radially inward direction by a pair of mutually mirror-image lines merging tangentially into the external contour of the drive disc and equidistant to the radially outer boundary lines of two adjacent kidney-shaped cutouts and by a tangential circle common to both equidistant lines.

17. A drive disc according to claim 1, wherein each of the kidney-shaped cutouts extend in both circumferential directions an equal distance from each respective fastening point.

18. An axially flexible drive disc made of sheet metal, the disc being connected to the end of a drive shaft of a vehicle engine by a centrally disposed flange and to an input element of an adjacent transmission radially outwardly by three fastening points spaced circumferentially substantially evenly, said drive disc including three kidney-shaped cutouts, each of the kidney-shaped cutouts being associated with a respective fastening point and disposed in the same area as the respective fastening point radially between the respective fastening point and the centrally disposed flange, each of said kidney-shaped cutouts extending in both circumferential directions with spoke-type webs remaining between adjacent kidney-shaped cutouts, each of said webs extending from said flange connection to a circumferential rim of the drive disc and being at least approximately twice and at most approximately three times as wide as a minimum width of the circumferential rim of the drive disc which extends toward the fastening points, each of said kidney-shaped cutouts being contoured along a radially inner contour generally in the shape of an arc having a radius of curvature from 1.5 to 4 times that of a circumferential circle of the centrally disposed flange, the inner contour of each of the plurality of kidney-shaped cutouts touching the circumferential circle of the centrally disposed flange at a peripheral position generally coinciding with the intersection of a line passing through the corresponding fastening point and the center of the drive disc.

19. A drive disc according to claim 18, wherein at least one of the circumferential rim and the spoke-type webs is provided at a transition from the fastening points respectively to the central flange connection with a discontinuity point in the form of one of a step-type increase of the surface moment of inertia against axial bending and a corrugation means of the sheet metal part extending transversely to the circumferential rim respectively to the spoke-type webs.

20. A drive disc according to claim 18, wherein the discontinuity point is on each of the respective spoke-type webs and is located within an area at least approximately radially midway between the narrowest place of the webs and the circumferential circle of the central flange.

21. A drive disc according to claim 19, wherein the discontinuity point is a corrugation means formed in the shape of a U-shaped groove with a clearance depth between about half the sheet metal thickness and about the full sheet metal thickness.

22. A drive disc according to claim 18, wherein each of the kidney-shaped cutouts extend in both circumferential directions an equal distance from each respective fastening point.

* * * * *